US010420158B2

(12) United States Patent
Voloshin

(10) Patent No.: US 10,420,158 B2
(45) Date of Patent: Sep. 17, 2019

(54) METHOD, SYSTEM, AND PROGRAM PRODUCT FOR IMPROVING QUALITY OF ELECTRONIC COMMUNICATIONS

(71) Applicant: Timur Voloshin, Hallandale, FL (US)

(72) Inventor: Timur Voloshin, Hallandale, FL (US)

( * ) Notice: Subject to any disclaimer, the term of this patent is extended or adjusted under 35 U.S.C. 154(b) by 0 days.

(21) Appl. No.: 16/219,930

(22) Filed: Dec. 13, 2018

(65) Prior Publication Data

US 2019/0116625 A1 Apr. 18, 2019

Related U.S. Application Data

(63) Continuation of application No. 15/391,527, filed on Dec. 27, 2016, now abandoned.

(51) Int. Cl.

| | |
|---|---|
| ***H04W 40/00*** | (2009.01) |
| ***H04L 12/28*** | (2006.01) |
| ***H04M 11/00*** | (2006.01) |
| ***G06F 15/173*** | (2006.01) |
| ***H04W 76/12*** | (2018.01) |
| *H04W 8/18* | (2009.01) |
| *H04W 24/08* | (2009.01) |
| *H04W 76/19* | (2018.01) |

(52) U.S. Cl.

CPC .............. *H04W 76/12* (2018.02); *H04W 8/18* (2013.01); *H04W 24/08* (2013.01); *H04W 76/19* (2018.02)

(58) Field of Classification Search

CPC ........ H04W 76/19; H04W 8/18; H04W 24/08

USPC ........................................................ 455/445

See application file for complete search history.

(56) References Cited

U.S. PATENT DOCUMENTS 9,178,952 B2 * 11/2015 Acharya ................ H04L 41/12
2004/0077331 A1 * 4/2004 King ..................... H04W 24/00 455/405
2008/0101375 A1 * 5/2008 Condini .................. H04L 41/06 370/395.21
2014/0341061 A1 * 11/2014 Shinada ................ H04W 16/18 370/252
2016/0165513 A1 * 6/2016 Yeager ................ H04M 3/2227 455/445
2018/0227315 A1 * 8/2018 Taneja ............... H04L 63/1408

* cited by examiner

*Primary Examiner* — Rafael Pérez-Gutiérrez
*Assistant Examiner* — Mark G. Pannell
(74) *Attorney, Agent, or Firm* — Ariel S. Bentolila; Bay Area IP Group, LLC

(57) ABSTRACT

A method for routing communication for a user, wherein the routing system comprises an onward calling device a receiving device, and a communication computing system. The onward user may place an onward call for a receiver user identification and the receiving user may receive the onward call using the receiving device. Once the onward calling device and the receiving device are connected, the connection may continue for a sufficient time period. If the connection is discontinued the onward user may make no further attempt to connect with the receiving user, or the communication computing system may generate a subscriber ID of the receiving user and mark the good quality route for future connections with the receiving user.

6 Claims, 9 Drawing Sheets

METHOD, SYSTEM, AND PROGRAM PRODUCT FOR IMPROVING QUALITY OF ELECTRONIC COMMUNICATIONS

CROSS-REFERENCE TO RELATED APPLICATIONS

The present continuation patent application claims priority benefit of the U.S. nonprovisional patent application Ser. No. 15/915,527 entitled "A METHOD OF IMPROVING QUALITY OF ELECTRONIC COMMUNICATIONS" and filed 27 Dec. 2016 under 35 U.S.C. 119(e). The contents of this related patent application are incorporated herein by reference for all purposes to the extent that such subject matter is not inconsistent herewith or limiting hereof.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to electronic communications. More particularly, certain embodiments of the invention relate to an improved quality of electronic communications by analyzing particular actions of a user.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Various attempts are being made in the industry to improve the technical quality of communications, particularly communications made using electronic communication devices. The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that in telephone networks connections between two users, typically the calls with reference to long distance and international telephone calls, are established by multiple telephony providers cooperating with each other. Generally, to avoid no or bad connections due to bugs/error codes in any one of the providers' networks' routes may be changed to another backup provider. Alternate methods of connection, for example, IP telephony networks (Voice over IP—VoIP) may face floating connection problems which may result in failure of or poor quality connection.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
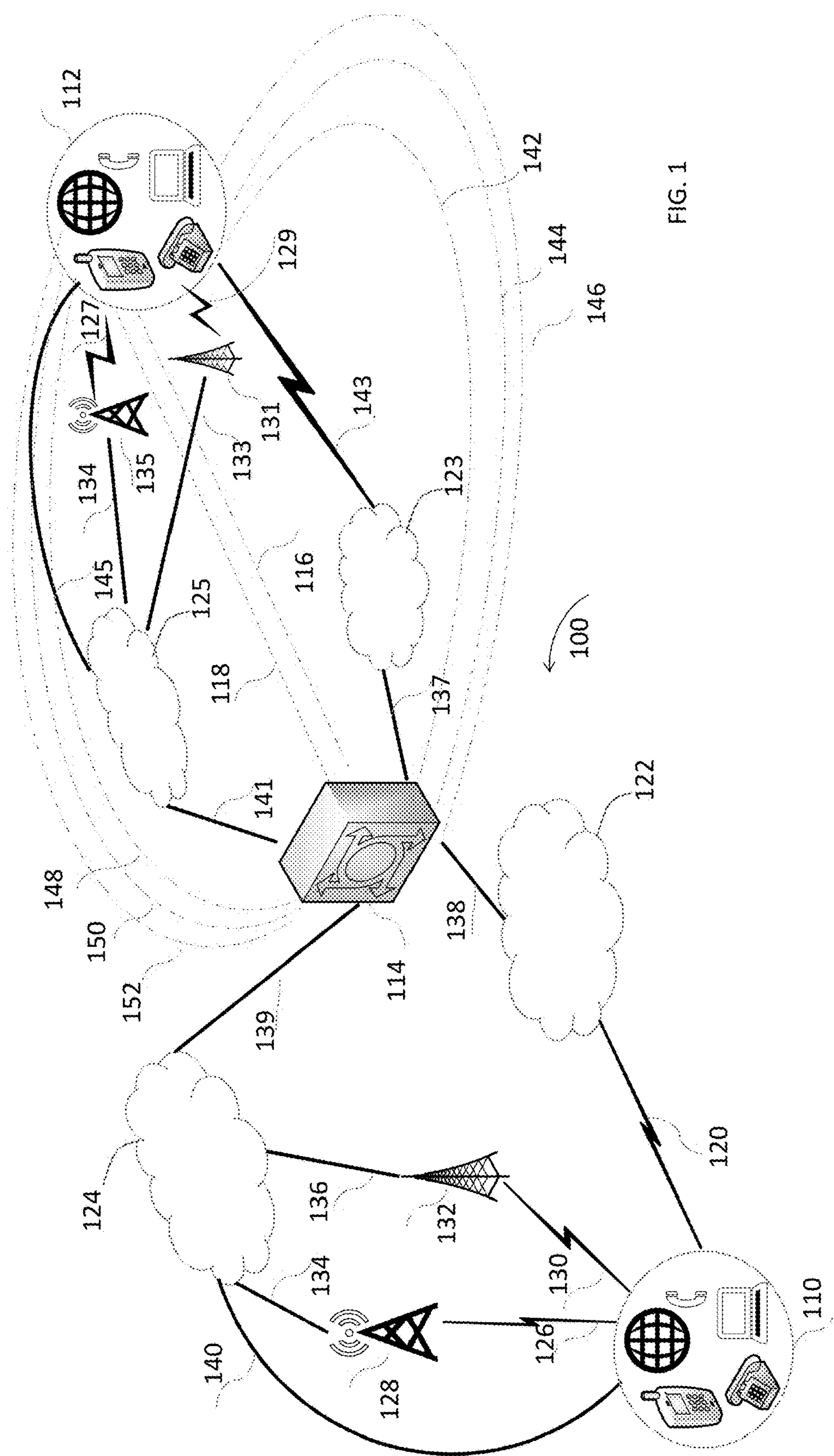
FIG. 1 illustrates an exemplary system for routing communication for a user, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law, as early as 1939, that words of approximation are not indefinite in the claims even when such limits are not defined or specified in the specification.

For example, see *Ex parte Mallory,* 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See *Energy Absorption Sys., Inc.* v. *Roadway Safety Servs., Inc.*, Civ. App. 96-1264, slip op. at 10 (Fed. Cir. Jul. 3, 1997) (unpublished) *Hybridtech* v. *Monoclonal Antibodies, Inc.,* 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See *Seattle Box Co.* v. *Industrial Crating & Packing, Inc.,* 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. *Deering Precision Instruments, L.L.C.* v. *Vector Distribution Sys., Inc.,* 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See *Dana Corp.* v. *American Axle & Manufacturing, Inc.*, Civ. App. 04-1116, 2004 U.S. App. LEXIS 18265, *13-14 (Fed. Cir. Aug. 27, 2004) (unpublished). The term "substantially" is commonly used by claim drafters to indicate approximation. See *Cordis Corp.* v. *Medtronic AVE Inc.,* 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also *Deering Precision Instruments, LLC* v. *Vector Distribution Sys., Inc.,* 347 F.3d 1314, 1322 (Fed. Cir. 2003); *Epcon Gas Sys., Inc.* v. *Bauer Compressors, Inc.,* 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, *Liquid Dynamics Corp.* v. *Vaughan Co.,* 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." *In Cordis Corp.* v. *Medtronic AVE, Inc.,* 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In *Anchor Wall Systems* v. *Rockwood Retaining Walls, Inc.,* 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see *Deering Precision Instruments, L.L.C.* v. *Vector Distrib. Sys., Inc.,* 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., *Epcon Gas Sys., Inc.* v. *Bauer Compressors, Inc.,* 279 F.3d 1022 (Fed. Cir. 2002) (construing the terms "substantially constant" and "substantially below"); *Zodiac Pool Care, Inc.* v. *Hoffinger Indus., Inc.,* 206 F.3d 1408 (Fed. Cir. 2000) (construing the term "substantially inward"); *York Prods., Inc.* v. *Cent. Tractor Farm & Family Ctr.,* 99 F.3d 1568 (Fed. Cir. 1996) (construing the term "substantially the entire height thereof"); *Tex. Instruments Inc.* v. *Cypress Semiconductor Corp.,* 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see *AK Steel Corp.* v. *Sollac,* 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by *Pall Corp.* v. *Micron Separations, Inc.,* 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see *Verve LLC* v. *Crane Cams Inc.,* 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In *Andrew Corp.* v. *Gabriel Elecs. Inc.,* 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in *Ecolab Inc.* v. *Envirochem, Inc.,* 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see *Ecolab Inc.* v. *Envirochem Inc.,* 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see *Pall Corp.* v. *Micron Seps.,* 66 F.3d 1211, 1217, 36 USPQ2d 1225, 1229 (Fed. Cir. 1995); see, e.g., *Andrew Corp.* v. *Gabriel Elecs. Inc.,* 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see *Ex parte Mallory,* 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn. 112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see *Norian Corp.* v *Stryker Corp.,* 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

FIG. 1 illustrates an exemplary routing system 100 for routing communication for a user, in accordance with an embodiment of the present invention. The routing system 100 comprises at least an onward calling device 110, at least a receiving device 112, and at least a communication computing system 114. During a typical operation of the system 100 an onward user (not shown in figure) may place an onward call for a receiver user identification. A receiving user (not shown in figure) may receive the onward call using the receiving device 112. Once the onward calling device 110 and the receiving device 112 are connected, in one embodiment, the connection may continue for a sufficient time period, for example, route 116. After the connection is discontinued the onward user may make no further attempt to connect with the receiving user. In certain embodiments, the communication computing system may generate a subscriber ID of the receiving user (called subscriber) and mark the good quality route for future connections with the receiving user. In another embodiment, the onward call, routed, for example, via route 118, may get disconnected within a short interval/duration. It may be appreciated by a person with ordinary skill in the art, in light of and in accordance with the teachings of the present invention, that the short interval/time duration may depend on the route that is being attempted to be established between the onward calling device and the receiving device. In an exemplary embodiment, the short interval/time duration may include but not be limited to a time period of about 2 minutes to about 5 minutes. In various embodiments, the call may be disconnected due to reasons including but not limited to "no connection was established", "the onward user cannot hear the receiving user", "the receiving user cannot hear the onward caller", "unintelligible audibility", "interrupted sound", "voice latencies", "call drops", "bugs in the network used by the onward calling device", etc. . . . . Accordingly the onward user may use the onward calling device 112 and make an attempt to reestablish the connection with the receiving user within a short interval/duration. In this embodiment, the communication computing system 114 may treat this as a low/bad quality route 118 and capture the route details in a database (not shown in figure). In certain embodiments, the communication computing system may also generate a subscriber ID of the receiving user (called subscriber) and mark the low/good quality route for not being used in future connections with the receiving user. In certain embodiments, the communication computing system may delete the entry showing a preceding short duration call destined or a subscriber (group) once the information is used to determine the low-quality route. The communication computing system 114 includes a designated computer program that enables the communication computing system 114 to select an optimum route for an outbound call. The communication computing system may generate a subscriber ID for a single subscriber or a group of subscribers. In various embodiments, the subscriber ID may be generated when one subscriber calls a group of subscribers, when a group of subscribers call a group of subscribers, or when all subscribers call a group of subscribers.

It may be appreciated by a person with ordinary skill in the art, in light of and in accordance with the teachings of the present invention, that the onward calling device 110 may include any device capable of initiating a communication over multiple connection types. In various embodiments, the onward calling device may include communication devices that can initiate communication over 120 a cellular communication network 122, over a network like internet 124, and the like. The onward calling device 110 may include, but not be limited to devices like, Voice over internet protocol (VoIP gateway) phone; Internet protocol phone (IP-phone); Session Initiation Protocol phone (SIP-phone); and digital communication devices like mobile phone, lap top, personal computer, personal digital assistant (PDA), corded telephone, cordless telephone, fax machine, integrated services digital network (ISDN) telephone, private branch exchange (PBX), and the like.

In one embodiment, the cellular communication network 122 may employ a code division multiple access (CDMA) protocol (e.g., CDMA2000), a time division multiple access (TDMA) protocol (e.g., GSM), or any another communication protocol compatible with the cellular communication network 122. The outbound calling device 110 may also be capable of communicating over multiple different networks. In one embodiment, the outbound calling device 110 may connect to the Internet 124 through 126 network interfaces like a wireless local area network 128 (e.g., a Wi-Fi network). In another embodiment, the outbound calling device 110 may connect to the Internet 124 through 130 network interfaces like a wireless wide area network 132 (e.g., a WiMAX network).

It may be appreciated by a person with ordinary skill in the art, in light of and in accordance with the teachings of the present invention, that the receiving deviec 112 may include a device similar to or different from the onward calling device 110. The receiving device 112 may include any device capable of receiving a communication over multiple connection types. In various embodiments, the receiving device may include communication devices that can receive communication over 143 a cellular communication network 123, over a network like internet 125, and the like. The receiving device 112 may include, but not be limited to devices like, Voice over internet protocol (VoIP gateway) phone; Internet protocol phone (IP-phone); Session Initiation Protocol phone (SIP-phone); and digital communication devices like mobile phone, lap top, personal computer, personal digital assistant (PDA), corded telephone, cordless telephone, fax machine, integrated services digital network (ISDN) telephone, private branch exchange (PBX), and the like.

In one embodiment, the cellular communication network 123 may employ a code division multiple access (CDMA) protocol (e.g., CDMA2000), a time division multiple access (TDMA) protocol (e.g., GSM), or any another communication protocol compatible with the cellular telephone network. The receiving device 112 may also be capable of communicating over multiple different networks. In one embodiment, the receiving device 112 may connect to the Internet 125 through 141 network interfaces like a wireless local area network 135 (e.g., a Wi-Fi network). In another embodiment, the receiving device 112 may connect to the Internet 125 through 137 network interfaces like a wireless wide area network 131 (e.g., a WiMAX network).

It may be appreciated by a person with ordinary skill in the art, in light of and in accordance with the teachings of the present invention, that the communication computing system 114 may receive the incoming calls 127, 129, 143, 145 made from the outgoing call device 110 to the receiving device 112. The communication computing system 114 may receive the outgoing calls 134, 136, 138, 140 over the internet, over the cellular communication network, from a computer, etc. . . . and connect the incoming calls 127, 129, 143, 145 to the receiving device 112 over the internet, over the cellular communication network, from a computer, etc. . . . . In various embodiments, the local area network, the wireless wide area network, the cellular communication network connecting the calls between the ongoing call device 110 and the receiving device 113 via the communication computing system 114 may be same or different.

In various embodiments, both the outgoing call device 110 and the receiving device 112 may include but are not limited to digital devices, an analog device, or a combination thereof. In embodiments where either one or both of the outgoing call device 110 and the receiving device 112 may be an analog device, the analog device may communicate with the communication computing system 114 via a voice gateway, i.e., a router public switched telephone network (PSTN) gateway. In various embodiments, the gateway may be placed in different places including but not limited to, between user's device and a digital network, inside PSTN between its parts (digital part and analog part), between PSTN and communication computing system 114. In various embodiments, the communication computing system 114 may provide different functions to provide a good quality route for the outgoing call device 110 to connect to the receiving device 112. The different functions may include but are not limited to identification for the outgoing call device, identification of the receiving device, user identification (subscriber ID) for the outgoing call device, subscriber ID extraction, subscriber ID creating, routing of the call, selection of good quality route for the call, detection of call drops, exclusion of bad quality routes, and the like. For example, the communication computing system 114 may include a designated software to determine and recognize that a user may be making a second call to a receiving device 112 within a very short duration/period of having made a first call to the receiving device 112. The communication computing system 114 may then use the designated software to determine the quality of the route used by the outgoing call device 110. The communication computing system 114 may then extract a user identification (subscriber's ID) and select a good quality route for making the connection between the outgoing call device 110 and the receiving device 112. The communication computing system 114 may use the designated software to exclude bad quality routes 118 and provide a plurality of alternate good quality routes 142, 144, 146, 148, 150, 152, and the like for the user identified with the subscriber ID at least whenever the user tries to make the connection to the same receiving device 112. In various embodiments, any or some of routes 116, 118, 142, 144, 146, 148, 150, 152 may include but are not limited to, VoIP routes (like different VoIP providers or different internet connections), different PSTN routes (digital or analog), different wireless networks, etc. . . . .

It may be appreciated by a person with ordinary skill in the art, in light of and in accordance with the teachings of the present invention, that the communication computing system 114 may include virtually any communication actuation device capable of identifying an outgoing call device 110, identifying a receiving device 112, and determining a good quality route 116 whenever a call is made from the outgoing call device 110 to the receiving device 112. Non-limiting examples of the communication computing system 114 may include but are not limited to session initiation protocol (SIP) server, SIP proxy, softswitch, digital PBX, virtual PBX, h.323 gatekeeper, VoIP router, and any compatible telecommunication routing system as may be appreciated by a person with ordinary skill in the art, in light of and in accordance with the teachings of the present invention. The communication computing system 114 may include any computing platform that executes computer software and/or code from a non-transitory computer readable medium. The communication computing system 114 may include a single device or multiple devices. In embodiments where the communication computing system 114 is a single device all the functions of identification for the outgoing call device, identification of the receiving device, user identification (subscriber ID) for the outgoing call device, subscriber ID extraction, subscriber ID creating, routing of the call, selection of good quality route for the call, detection of call drops, exclusion of bad quality routes, may be executed by the single communication computing system 114. In embodiments where the communication computing system 114 includes multiple devices these functions may be distributed between the multiple devices. For example, identification for the outgoing call device, identification of the receiving device, user identification (subscriber ID) for the outgoing call device, subscriber ID extraction, subscriber ID creating, routing of the call, selection of possible routes for the call, and detection of call drops, may be done by one communication computing system and the exclusion of bad quality routes may be executed by another communication computing system. In another embodiment, the communication computing system 114 is a single device. In one embodiment, the communication computing system 114 may be a part of the ongoing call device 110 in the form of a routing system, a routing software, a routing module, a designated routing program, etc. . . . .

It may be appreciated by a person with ordinary skill in the art, in light of and in accordance with the teachings of the present invention, that the communication computing system 114 may connect to any number of devices with virtually any wired and/or wireless means. The communication computing system may connect to virtually any device by means such as, but not limited to, Bluetooth connection, Ethernet cable, USB cable, WIFI, IRDA, etc. . . . . In one embodiment, the communication computing system 114 may connect to other devices for gathering information on good quality routes for an identified subscriber ID. In another embodiment, the computing system may connect to other devices for excluding bad quality routes for the identified subscriber ID.

It may be appreciated by a person with ordinary skill in the art, in light of and in accordance with the teachings of the present invention, that the route quality information gathered may partially or completely be contained in a local computing platform and/or network. In an alternative embodiment of the present invention, the route quality information gathered may be located on a local computer network. In an alternative embodiment of the present invention, the route quality information gathered may be located on any computer located anywhere and be reachable via network, for example, LAN, WAN, VPN, or Internet.

Figure 2:
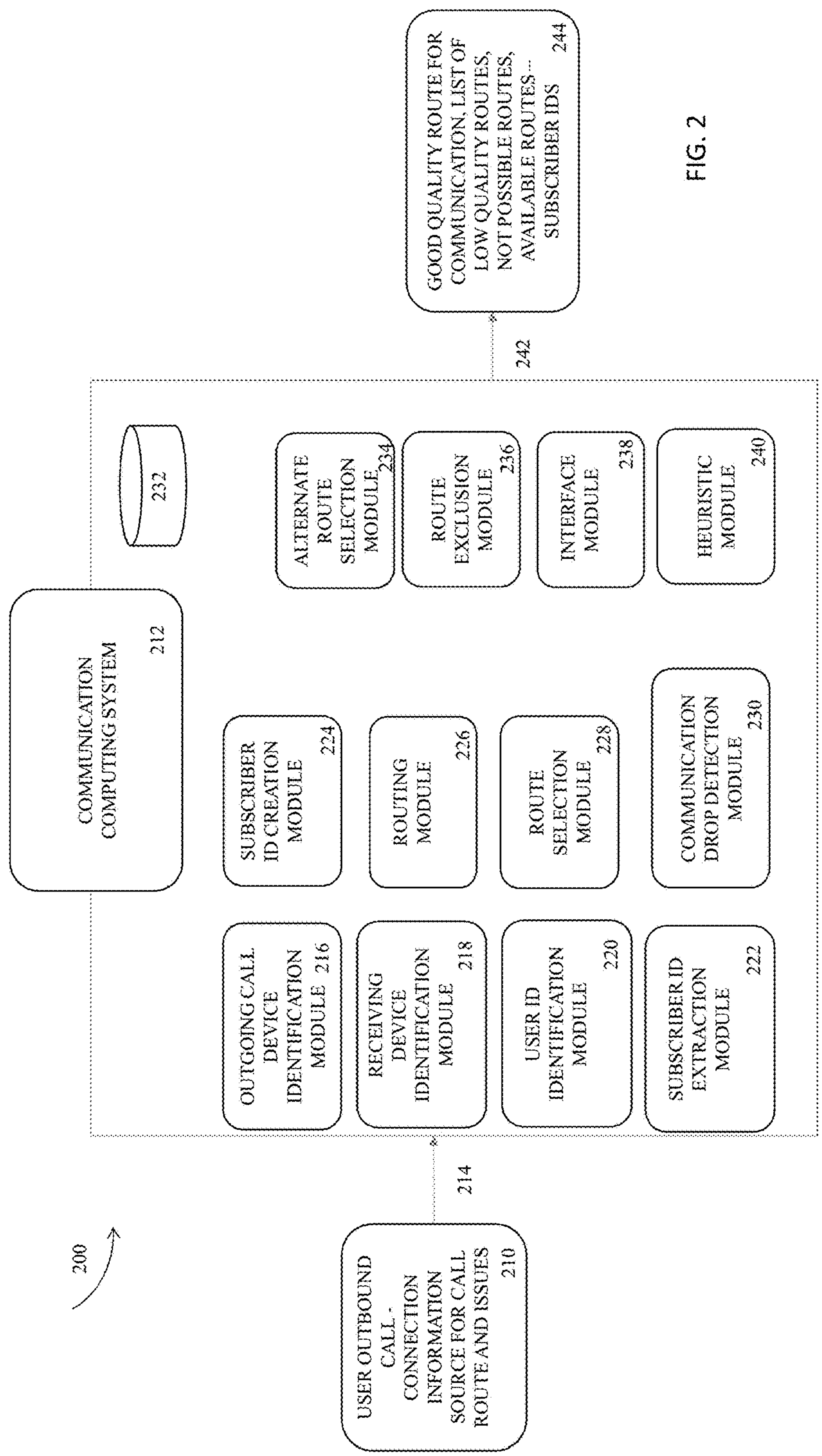
FIG. 2 illustrates an architecture of an exemplary system for routing communication for a user, in accordance with an embodiment of the present invention.

FIG. 2 illustrates an architecture of an exemplary system for routing communication for a user, in accordance with an embodiment of the present invention. A routing communication for a user system architecture 200 may comprise a communication computing system 212. The communication computing system 212 includes, an outgoing call device identification module 216, a receiving device identification module 218, a user ID identification module 220, a subscriber ID extraction module 222, a subscriber ID creating module 224, a routing module 226, a route selection module 228, a communication drop detection module 230, a database 232, an alternate route selection module 234, a route exclusion module 236, an interface module 238, and a heuristic module 240. In one embodiment, the input 214 information for the communication computing system 216 may be obtained from an outgoing call made by a user 210, that provides a source for connection information, call route and connection issues. In various embodiments, the output 242 information 244 for the communication computing system 212 may include, but are not limited to list of good quality routes, list of low quality routes, list of not possible routes, and list of all possible routes for an identified receiver subscriber ID or group ID. The outgoing call device identification module 216, may have a means of identifying the outgoing call device, such as, without limitation, a processing unit, a computer, or a server to execute computer code and/or algorithms from a non-transitory computer readable medium for device identification. The receiving device identification module 218, may have a means of identifying the receiving device, such as, without limitation, a processing unit, a computer, or a server to execute computer code and/or algorithms from a non-transitory computer readable medium for device identification. The user ID identification module 220, may have a means of identifying the user ID, such as, without limitation, a processing unit, a computer, or a server to execute computer code and/or algorithms from a non-transitory computer readable medium for user ID identification. The subscriber ID extraction module 222, may have a means of extracting the subscriber ID, such as, without limitation, a processing unit, a computer, or a server to execute computer code and/or algorithms from a non-transitory computer readable medium for ID extraction. The subscriber ID creation module 224, may have a means of creating a subscriber ID, such as, without limitation, a processing unit, a computer, or a server to execute computer code and/or algorithms from a non-transitory computer readable medium for ID creation. The routing module 226, may have a means of identifying a communication route, such as, without limitation, a processing unit, a computer, or a server to execute computer code and/or algorithms from a non-transitory computer readable medium for communication route identification. The route selection module 228, may have a means of selecting a communication route, such as, without limitation, a processing unit, a computer, or a server to execute computer code and/or algorithms from a non-transitory computer readable medium for communication route selection. The communication drop detection module 230, may have a means of detecting a communication drop, such as, without limitation, a processing unit, a computer, or a server to execute computer code and/or algorithms from a non-transitory computer readable medium for communication drop detection. The alternate route selection module 234, may have a means of selecting a communication route, such as, without limitation, a processing unit, a computer, or a server to execute computer code and/or algorithms from a non-transitory computer readable medium for alternate communication route selection. The route exclusion module 236, may have a means of selecting a communication exclusion route, such as, without limitation, a processing unit, a computer, or a server to execute computer code and/or algorithms from a non-transitory computer readable medium for communication route exclusion. The interface module 238, may have a means of providing an interface, such as, without limitation, a processing unit, a computer, or a server to execute computer code and/or algorithms from a non-transitory computer readable medium to assist the communication computing system in performing its various functions. The heuristic module 240, may have a means of self-learning, such as, without limitation, a processing unit, a computer, or a server to execute computer code and/or algorithms from a non-transitory computer readable medium to assist the assimilation of good quality routes and bad quality routes and route the calls of a repeat subscriber or a first time subscriber in making outgoing/outbound calls through good quality routes.

The database 232 may be, but not limited to, a plurality of data servers, and a memory card. It may be appreciated by a person with ordinary skill in the art, in light of and in accordance with the teachings of the present invention, that the database may contain virtually any user data to enable the assimilation of good quality routes and bad quality routes and route the calls of a repeat subscriber or a first time subscriber in making outbound calls through good quality routes. In another embodiment, the user data may be stored in a memory card in the communication computing system 114.

It may be appreciated by a person with ordinary skill in the art, in light of and in accordance with the teachings of the present invention, that one or more modules may be embodied in a single device. In an alternative embodiment of the present invention, that one or more modules may be embodied in multiple devices.

It may be appreciated by a person with ordinary skill in the art, in light of and in accordance with the teachings of the present invention, that virtually any algorithm and/or computer code may be used to identify the outgoing call device and receiving device on the identification modules 216 and 218 respectively. Device identification algorithms and/or methods may include, without limitation, identification by network address, for example, internet protocol (IP) address, media access control (MAC) address, and the like; identification by caller ID, for example, telephone number, subscriber number, and the like; identification by secret code, for example, postal index number (PIN) code, password, pass phrase, and the like; identification by login/password pare, identification by public/private keys pare, identification by physical connection, for example, device used for connection, physical port, line, and the like.

It may be appreciated by a person with ordinary skill in the art, in light of and in accordance with the teachings of the present invention, that virtually any algorithm and/or computer code may be used to identify the user ID on the user ID identification module 220. User ID identification algorithms and/or methods may include, without limitation, identification by network address, for example, internet protocol (IP) address, media access control (MAC) address, and the like; identification by caller ID, for example, telephone number, subscriber number, and the like; identification by secret code, for example, postal index number (PIN) code, password, pass phrase, and the like; identification by login/password pare, identification by public/private keys pare, identification by physical connection, for example, device used for connection, physical port, line, and the like.

It may be appreciated by a person with ordinary skill in the art, in light of and in accordance with the teachings of the present invention, that virtually any algorithm and/or computer code may be used to extract the subscriber ID using the subscriber ID extraction module 222. Extraction algorithms and/or methods may include, without limitation, determination by prefix, for example, first digits of a telephone number, first letters of user ID, etc. . . . ; determination by domain; determination by domain name suffix, for example ".com", ".ru" etc. . . . ; determination by region, for example, country, continent, state, region of a country, city, etc. . . . ; determination by origination or destination network; determination by network type, for example, landline, cell phone, etc. . . . ; determination by connection data, for example, connection delay, packet lost factor, throughput, etc. . . . ; and the like.

It may be appreciated by a person with ordinary skill in the art, in light of and in accordance with the teachings of the present invention, that virtually any algorithm and/or computer code may be used to create the subscriber ID using the subscriber ID creation module 224. Creation algorithms and/or methods may include, without limitation, extraction from user (or subscriber) address, concatenation with random number, concatenation with random alphanumeric sequence, concatenation with common integer numbers sequence, concatenation with a specific destination/originator ID, for example, domain name suffix or country code, etc. . . . , and the like. In various embodiments, the subscriber ID may be created using information including, but not limited to, telephone numbers, user name, login name, IP address, alias of a user or of a device, and like information. In one embodiment, the subscriber ID may include several digits of a communication code, for example, (i) if it is a telephone number being dialed then the subscriber ID may include several digits of the dialed number with predetermined length; or (ii) it may include part of the user name and part of the telephone number; or (iii) it may include several digits of the dialed number where part of numbers may be transformed to alphabets or symbols to provide an alphanumeric subscriber ID. In another example, if an email id is being used for communication then part of the email id in a predetermined length may be identified as the subscriber ID.

It may be appreciated by a person with ordinary skill in the art, in light of and in accordance with the teachings of the present invention, that virtually any algorithm and/or computer code may be used to route the communication using the routing module 226. Routing algorithms and/or methods may include, without limitation, destination (target) address setting, destination (target) device setting, destination (target) network setting, destination (target) port (line) setting, direct switching, wire connection establishing, and the like It may be appreciated by a person with ordinary skill in the art, in light of and in accordance with the teachings of the present invention, that virtually any algorithm and/or computer code may be used to select a route for communication using the route selection module 228. Route selection algorithms and/or methods may include, without limitation, least cost routing (LCR), routing by order, routing by prefix, round-robin routing, hot swap routing, routing on demand, fixed routing, routing by route (network) weight, and the like.

It may be appreciated by a person with ordinary skill in the art, in light of and in accordance with the teachings of the present invention, that virtually any algorithm and/or computer code may be used to detect a communication drop using the communication drop detection module 230. Communication drop detection algorithms and/or methods may include, without limitation, response (reply) code analyzer, electrical current (or resistance or voltage) measure, timeout detection, packet counter, silence detection, and the like.

It may be appreciated by a person with ordinary skill in the art, in light of and in accordance with the teachings of the present invention, that virtually any algorithm and/or computer code may be used to select a route for communication using the alternate route selection module 234. Route selection algorithms and/or methods may include, without limitation, least cost routing (LCR), routing by order, routing by prefix, round-robin routing, hot swap routing, routing on demand, fixed routing, routing by route (network) weight, and the like.

It may be appreciated by a person with ordinary skill in the art, in light of and in accordance with the teachings of the present invention, that virtually any algorithm and/or computer code may be used to exclude a route for communication using the route exclusion module 236. Route exclusion algorithms and/or methods may include, without limitation, exclusion by response (reply) code, exclusion upon timeout, exclusion based upon present invention algorithm, and the like.

It may be appreciated by a person with ordinary skill in the art, in light of and in accordance with the teachings of the present invention, that virtually any algorithm and/or computer code may be used to self-learn using the heuristic module 240. Self-learning algorithms and/or methods may include, without limitation, recording information about low quality routes in database with further recalling that information, alteration of routing table based upon routes quality information gathered in database, and the like.

It may be appreciated by a person with ordinary skill in the art, in light of and in accordance with the teachings of the present invention, that there may be a plurality of the same modules in routing communication for a user system architecture 200. A plurality of modules such as, without limitation, an outgoing call device identification module 216, a receiving device identification module 218, a user ID identification module 220, a subscriber ID extraction module 222, a subscriber ID creating module 224, a routing module 226, a route selection module 228, a communication drop detection module 230, a database 232, an alternate route selection module 234, a route exclusion module 236, an interface module 238, and a heuristic module 240, may be present in routing communication for a user system architecture 200. The plurality of similar modules may work in parallel or independently to improve the throughput and/or speed of routing communication for a user system architecture 200. In an alternative embodiment of the present invention, a plurality of identification, routing, selecting, extracting, creating, excluding, interface, self-learning, and storage modules may be connected to a routing communication for a user system via wired and wireless connections to access resources from different wired and wireless networks. In still another alternative embodiment of the present invention, a plurality of similar modules may form a secondary routing communication for a user system capable of seamlessly substituting an errant module.

It may be appreciated by a person with ordinary skill in the art, in light of and in accordance with the teachings of the present invention, that any module routing communication for a user system architecture 200 may perform data manipulation. Data manipulation such as, but not limited to, compression, encryption, formatting. In an alternative embodiment of the present invention, any module sending data may first compress the data prior to data transmission.

Figure 3A:
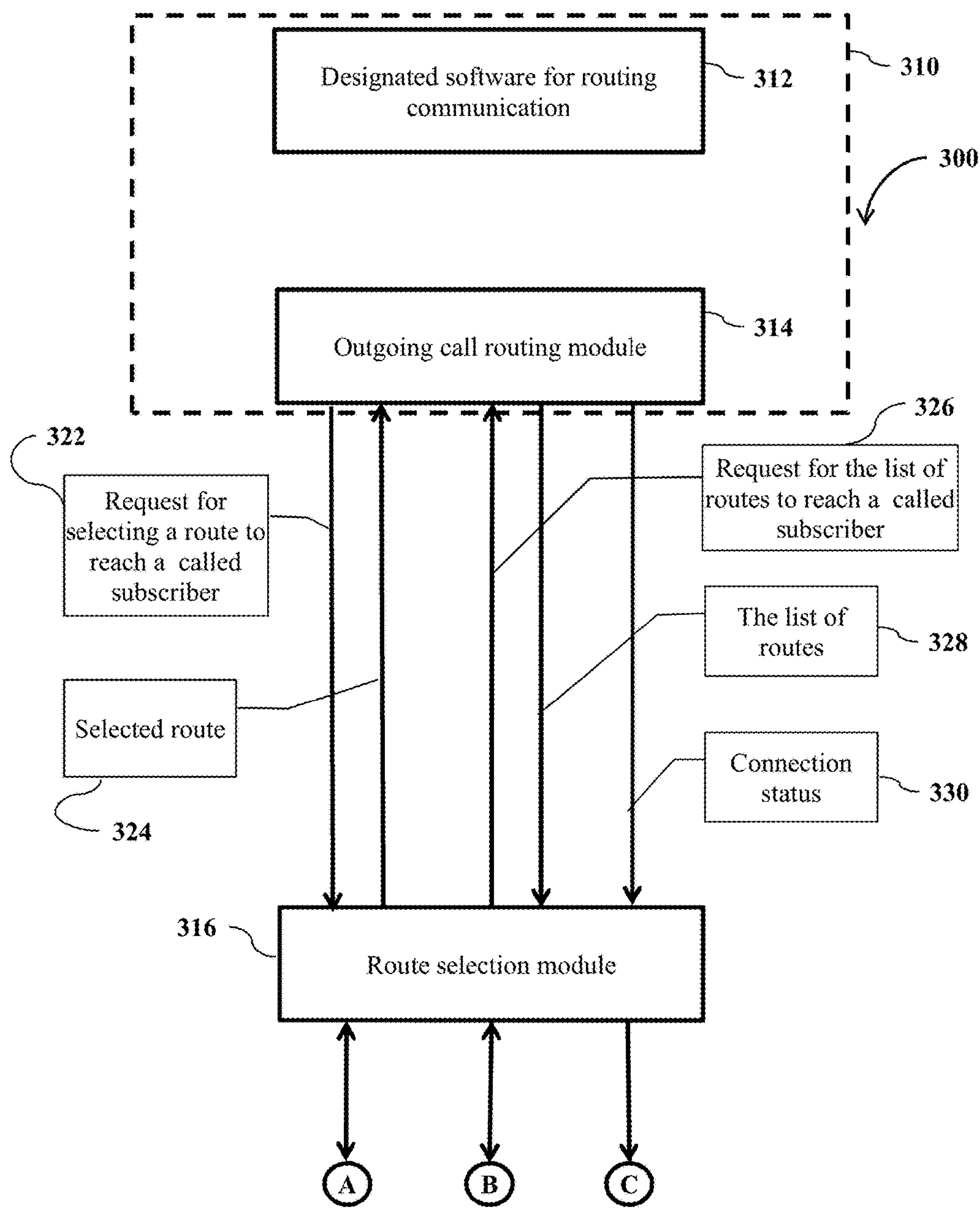
FIGS. 3A and 3B are a block diagram illustrating an exemplary process for routing communication for a user, in accordance with an embodiment of the present invention.
Figure 3B:
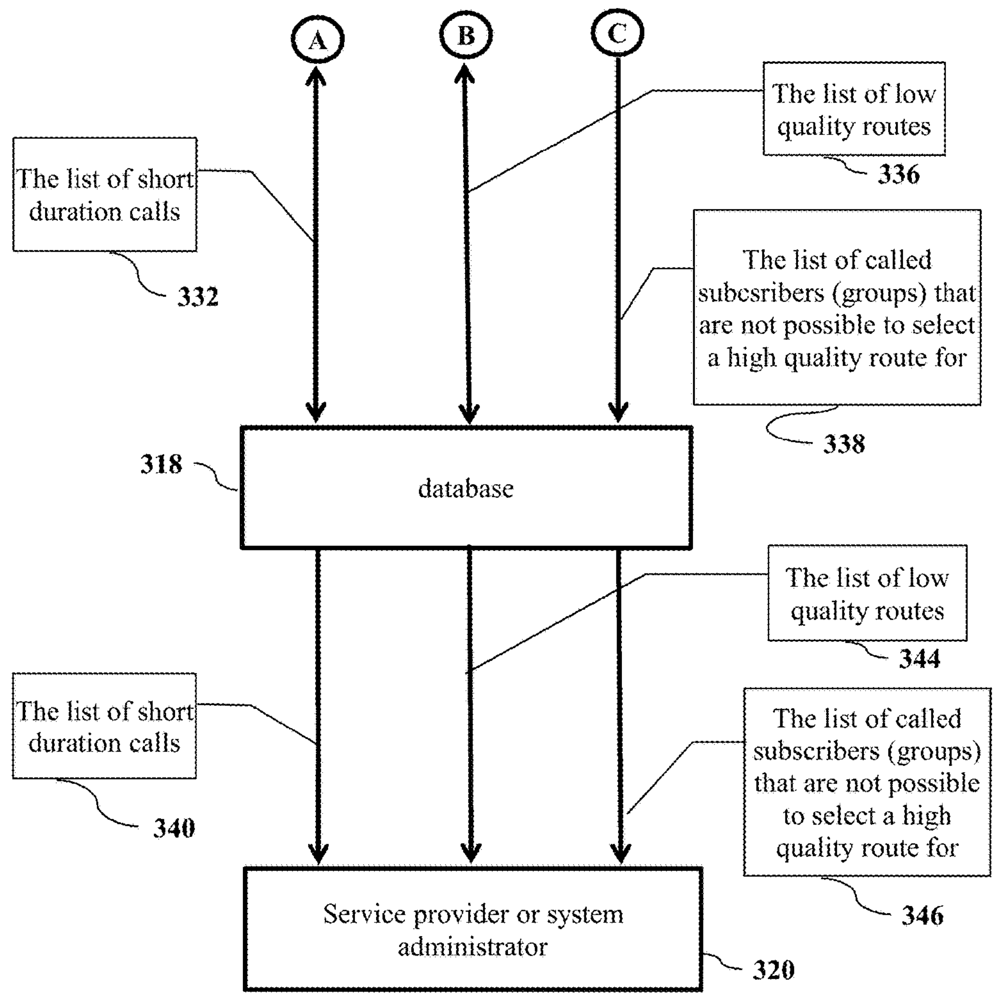

FIGS. 3A and 3B are a block diagram illustrating an exemplary process for routing communication for a user, in accordance with an embodiment of the present invention. During a typical operation of system 300 a communication computing system 310 is provided. The communication computing system 310 includes a designated software for routing communication 312 and an outgoing call routing module 314. The system 300 also includes a route selection module 316, a database 318, and system operator 320. In one embodiment, the system operator may include a human operator who may observe working of the communication computing system 310. For example, the system operator may observer and analyze these results, and conclude that the communication computing system may not have enough routes for some particular destination. The system operator may take appropriate actions, for example, find new routes and add them in the system.

In an exemplary embodiment, when a user places an outgoing call using an outgoing call device the outgoing call routing module 314 may use the designated software for routing communication 312 to place a request for selecting a route to reach a receiver 322 i.e., a called subscriber with the route selection module 316. The route selection module 316 provides a good quality selected route 324 to the outgoing call routing module 314 after performing a series of actions. The route selection module 316 may use the designated software for routing communication 312 to place a request for the list of routes that are available to reach a receiver 326. The outgoing call routing module 314 may then provide the list of available routes 328 and the connection status 330 to the route selection module 316. The connection status as mentioned herein, may include but is not limited to, a code which represents a current condition of a particular call, for example, connection is in progress, connection fails, call is connected, call was disconnected, and the like. The route selection module may employ the status to operate with call condition and call duration to implement the algorithm of quality route selection. The route selection module 316 then communicates with the database 318 to acquire certain information i.e., the list of short duration calls made by the subscriber 332, the list of low quality routes 334 that may have been previously identified for any subscriber but having a same/similar subscriber ID, etc. . . . . The route selection module 316 also provides an input 338 on the list of communications attempted where there was not possibility of selecting a high quality route to the database 318. In various embodiments, either the database 318 send the information on the list of short duration calls 340, the list of low quality routes 342, and the list of communications attempted where there was not possibility of selecting a high quality route to the systems operator 320 or the systems operator 320 may access this information from the database. The systems operator may then take necessary actions to prevent any of these routes being selected in future, for example, by adding more good quality routes to the list of allowed routes for reaching a particular receiver.

Figure 4A:
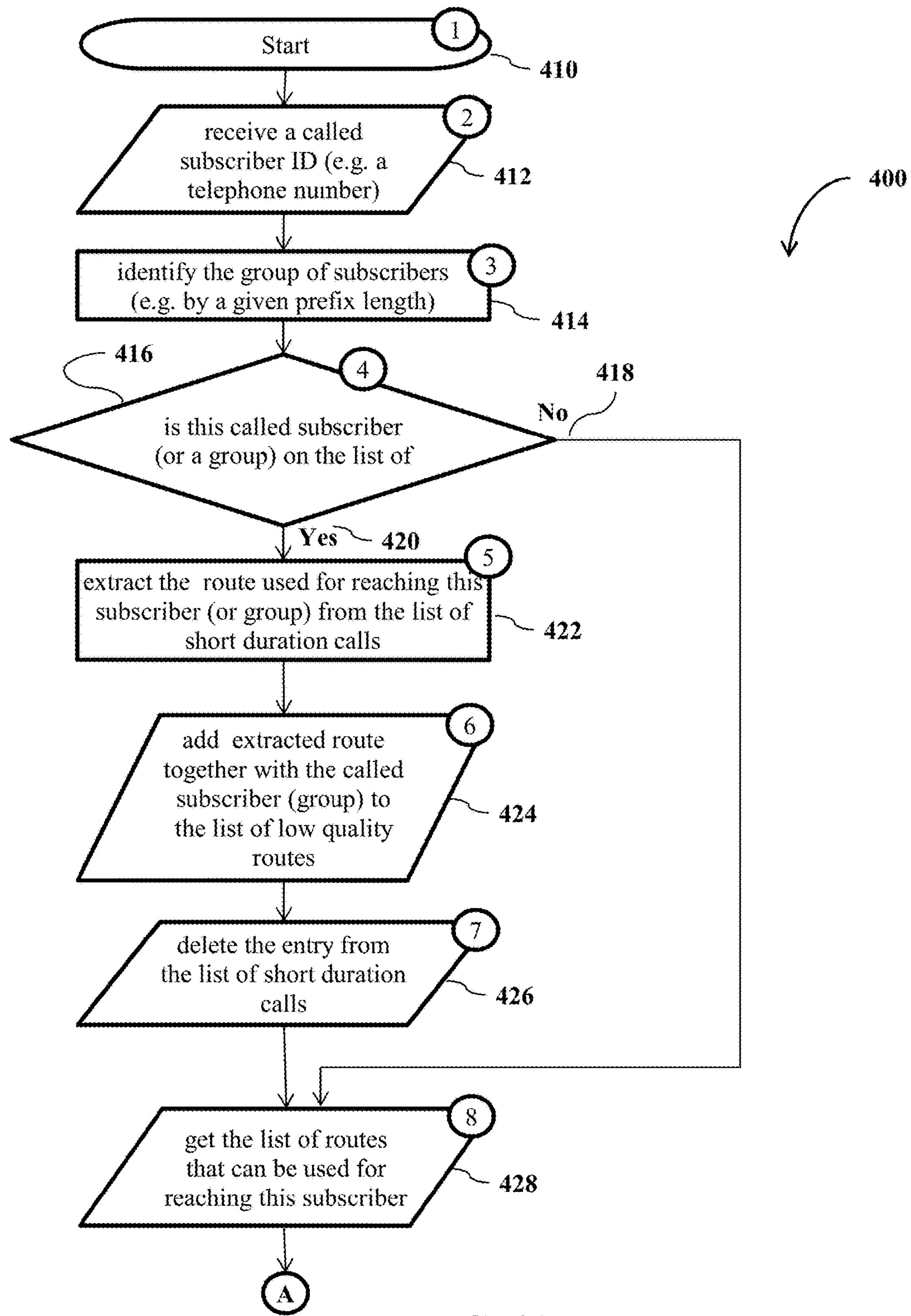
FIGS. 4A, 4B and 4C are a flow chart illustrating an exemplary process for routing communication for a user, in accordance with an embodiment of the present invention.
Figure 4B:
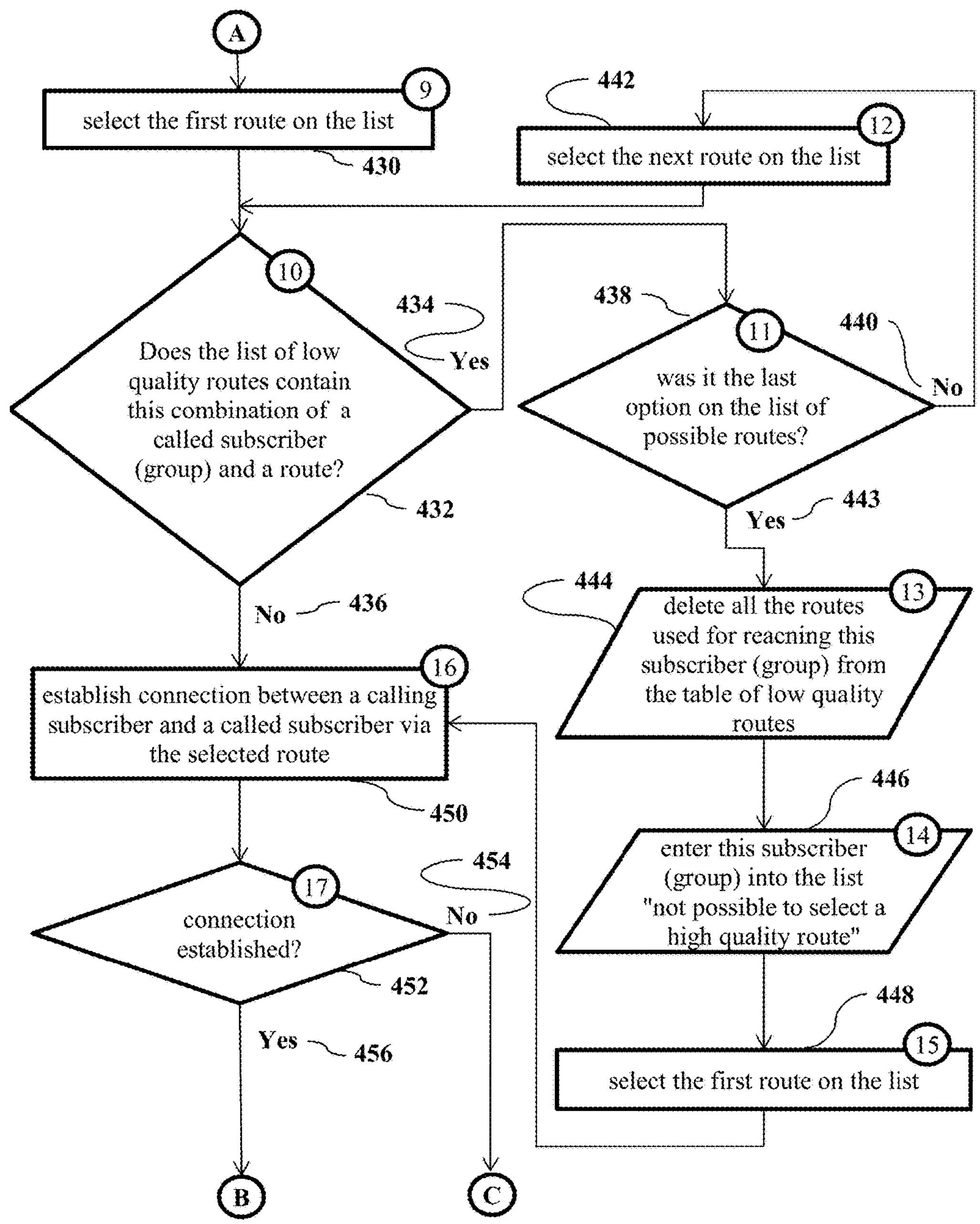
Figure 4C:
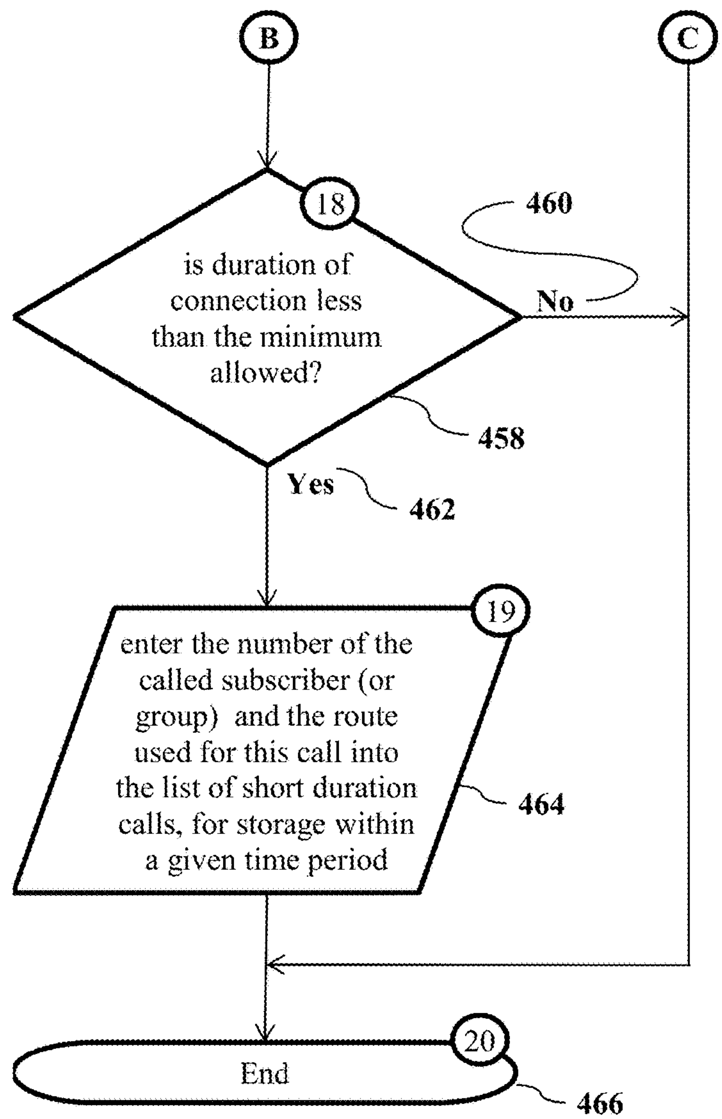

FIGS. 4A, 4B and 4C are a flow chart illustrating an exemplary process 400 for routing communication for a user, in accordance with an embodiment of the present invention. The process 400 for routing a communication for a user/subscriber starts with a step 410. In step 410 an external call routing unit launches the designated computer software to select the optimum route for an outgoing call. As described hereinabove, when an outgoing call is observed to get disconnected after a very short duration and a repeat of the outgoing call is made almost immediately after the disconnection, the calls may be identified as low/bad quality call, using this as a bad quality indicator. In one embodiment, a connection that ends in time period of 5 minutes may be considered as a threshold for a short call, an interval period of about 2 minutes between call attempts may be considered as a threshold for redial, i.e., if redial attempt was made in 2 minutes after short call was finished the redial attempt may be considered as low quality indicator, etc. . . . . A subscriber ID may be extracted from the, for example, telephone number, and a subscriber ID of a prefix length may be created for future use. Accordingly, in a step 412 a called subscriber ID (i.e., receiver's subscriber ID) may be extracted from the request, for which a high quality communication route needs to be selected. In a step 414, a subscriber ID of the subscribers group to which this particular called subscriber belongs may then be identified. In one exemplary embodiment, the first several digits of the dialed number (a given prefix length) may be used as a receiving subscriber's ID or as a receiving group's ID. In step 416 a check may be made to determine if this particular subscriber (or a group of subscribers) is on the list of recent short duration calls. The data on this list may be stored only for a limited period of time. It may be appreciated by a person with ordinary skill in the art, in light of and in accordance with the teachings of the present invention, that the limited period of time is a limitation of the time interval only between two subsequent call attempts, i.e., the information about a short call may be saved in a temporary table, and this information may be stored in a list/table only for a limited time period. In one embodiment, the time limit may be for about 2 minutes. If a user makes new redial attempt in this given interval, of about 2 minutes, a previous short call made by the user may be observed in the table, and the redial attempt may be considered as an indicator of bad quality for the all. In an embodiment, where, the user may take more than 2 minutes to make an attempt at making a call after a previous short call, the information in temporary table may be already lost and so this new call attempt may not be considered as a bad quality call indicator. It may be appreciated by a person with ordinary skill in the art, in light of and in accordance with the teachings of the present invention, that the limited period of time may be dependent on the call routes being used. In other embodiments, a call details record CDR may be stored the database for previous short call determinations. In one embodiment, if the exact called number (group) is on the list of short duration calls, this may mean that a user has now redialed this number after a preceding short phone conversation. The redialing of the number may in certain embodiments be attributed to failed or bad quality connection with this subscriber (group of subscribers). In an embodiment, where the exact called number (group) is not 418 on the list of short duration calls, then the designated computer program skips to step 428 of the process. In another embodiment, if the exact called number (group) is on the list of short duration calls, then the designated computer program moves on to step 422. In step 422 a route that may have been previously used to establish a connection with this subscriber (group) may be extracted from the corresponding entry of the list of short duration calls. In a next step 424 the route may be marked as bad quality because the outgoing call user is trying to reach the same subscriber, i.e., receiver, again after a short duration call. Accordingly, the subscriber ID extracted for this route (with called subscriber or group of subscribers) may then be included on the list of low/bad quality routes. In a step 426 the entry showing the preceding short duration call destined for this subscriber (group) may be deleted from the list of short duration calls because this information has already been used and the route has been marked as a low quality route. In embodiments where the CDR table may be employed instead of the table/list the process will move directly from step 424 to step 428. In step 428 a request for all possible routes that may be used to establish connection with this subscriber may be sent to the outgoing call routing unit. As described herein above where the exact called number (group) is not 418 on the list of short duration calls, then the designated computer program skips to step 428 of the process. In a next step 430 the lists received after making a request for all possible routes in step 428 is reviewed. In various embodiments, the routes may be reviewed in ascending order, descending order, in a random order, or the designated algorithm may include using of priorities or weights of the routes, sort/select routes from a given list of possible routes, etc. . . . . In one embodiment, the routes may be reviewed in order and the first route on the list may be selected. In step 432 the selected route it checked to determine if this particular combination of a called subscriber's (group's) ID and a route may be contained in the list of low quality routes. In an embodiment, where the subscriber's or group ID indicates that this route has already been used 434 before to establish connection with this subscriber (group) and was marked as low quality the designated computer software skips to step 438 of the process to review other options of routing. In an embodiment, where the subscriber's or group ID indicates that this route has not been used 436 before to establish connection with this subscriber (group), it may mean that this route is allowed for establishing connection with this subscriber and hence the designated computer software may skip to step 450 of the process. In step 438, a check may be made to identify any other options left on the list of possible routes that may be used to reach this subscriber. In an embodiment, where more route options may be available i.e., there are more routes that may be reviewed 440, the designated computer software may skip to step 442 of the process. In an embodiment, where no more route options may be left i.e., there may be no more possible routes on the list 443, designated computer software may skip to step 444 of the process. In step 442 the next route on the list of all possible routes that can be used to reach this subscriber may then be selected for review. The process then again loops back to step 430 for analysis of the selected route and following steps. In step 444 it may be determined that there may be no more options on the list of possible routes i.e., all routes have been tried and designated as low quality routes. In such an event, if the process to try and make a connection with the called subscriber (receiver) is terminated then the connection may never happen. Accordingly, in one embodiment, the designated computer software is programmed to delete all the routes that were used to reach this particular subscriber (group) from the list of low quality routes. In a next step 446 the event of step 444 is logged and all the data regarding the situation and the called subscriber are entered into the "not possible to select a high quality route" list. This list may be made available to the system operator (administrator) who can take actions to prevent such situations in the future, for example, add more possible routes to the list of allowed routes for reaching this subscriber. In a next step 448, a new attempt is made to test all possible routes all over again, by selecting the first route on the list. As mentioned hereinabove, in various embodiments, the routes may be reviewed in ascending order, descending order, in a random order, or the designated algorithm may include using of priorities or weights of the routes, sort/select routes from a given list of possible routes, etc. . . . . In one embodiment, the routes may be reviewed in order and the first route on the list may be selected. In a step 450 connection may be established between the outgoing call subscriber and the called subscriber (receiver) via the selected route from step 448. In step 452 the connection status/call status (as discussed in FIGS. 3A and 3B) may be checked. In an embodiment, where the connection has not been established 454, the execution of the designated computer software is over the process comes to an end in step 466. In an embodiment, where the connection may be established, the designated computer software continues the process to the next step 458. In step 458 another check is made to determine the duration of the established connection with reference to the minimum duration required to determine it as a good quality connection. In an embodiment, where the conversation may be determined to be long enough, the execution of the designated computer software is over the process comes to an end in step 466. In an embodiment, where the conversation may not be determined as long enough, i.e., determined as short duration, the execution of the designated computer software proceeds to step 464. In step 464 the ID of the called subscriber (group) and the route used for connection may entered into the list of short duration calls, for storage within a given period of time (as discussed herein above). In step 466 the process comes to an end.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Figure 5:
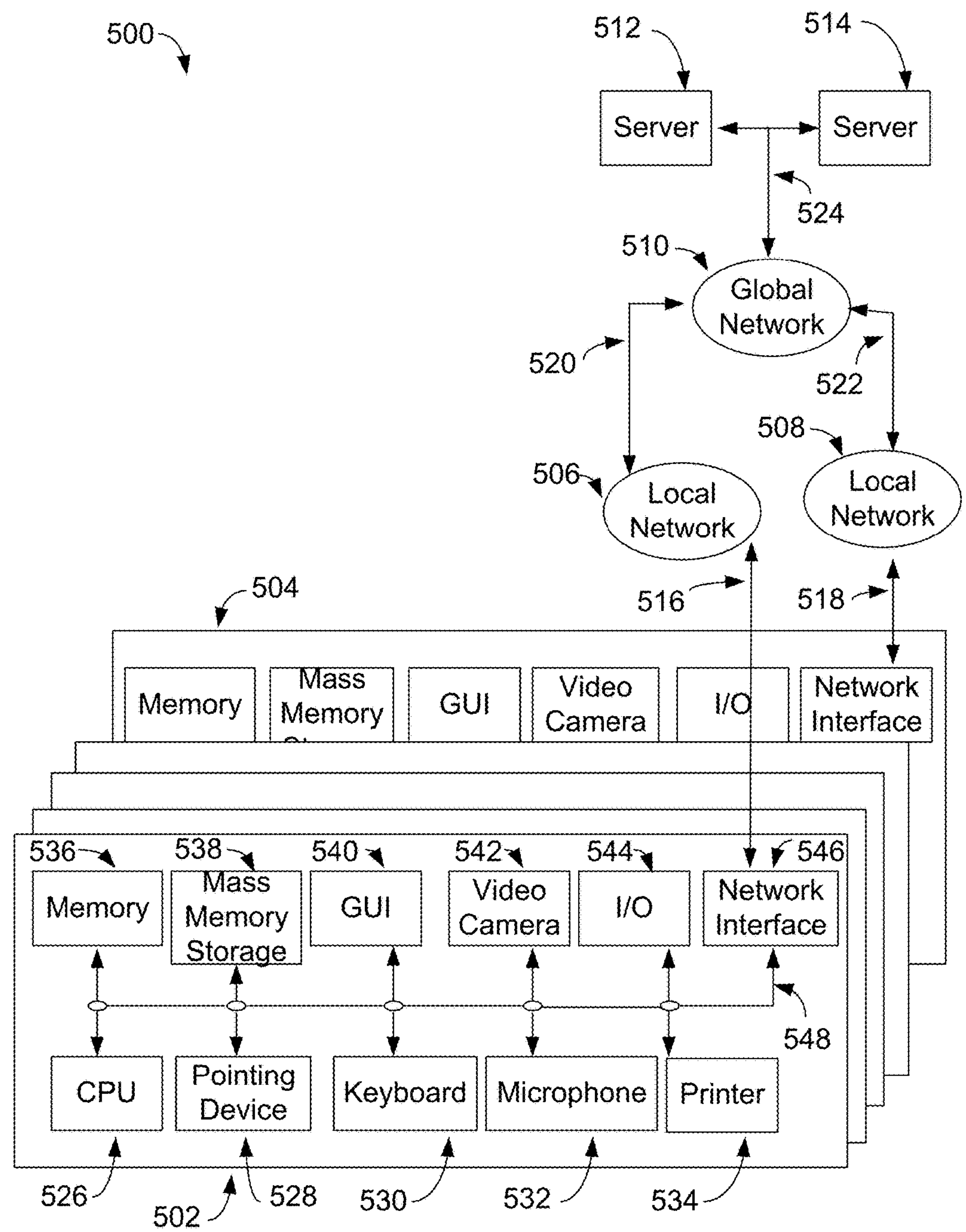
FIG. 5 is a block diagram depicting an exemplary client/server system which may be used by an exemplary web-enabled/networked embodiment of the present invention.

FIG. 5 is a block diagram depicting an exemplary client/server system which may be used by an exemplary web-enabled/networked embodiment of the present invention.

A communication system 500 includes a multiplicity of clients with a sampling of clients denoted as a client 502 and a client 504, a multiplicity of local networks with a sampling of networks denoted as a local network 506 and a local network 508, a global network 510 and a multiplicity of servers with a sampling of servers denoted as a server 512 and a server 514.

Client 502 may communicate bi-directionally with local network 506 via a communication channel 516. Client 504 may communicate bi-directionally with local network 508 via a communication channel 518. Local network 506 may communicate bi-directionally with global network 510 via a communication channel 520. Local network 508 may communicate bi-directionally with global network 510 via a communication channel 522. Global network 510 may communicate bi-directionally with server 512 and server 514 via a communication channel 524. Server 512 and server 514 may communicate bi-directionally with each other via communication channel 524. Furthermore, clients 502, 504, local networks 506, 508, global network 510 and servers 512, 514 may each communicate bi-directionally with each other.

In one embodiment, global network 510 may operate as the Internet. It will be understood by those skilled in the art that communication system 500 may take many different forms. Non-limiting examples of forms for communication system 500 include local area networks (LANs), wide area networks (WANs), wired telephone networks, wireless networks, or any other network supporting data communication between respective entities.

Clients 502 and 504 may take many different forms. Non-limiting examples of clients 502 and 504 include personal computers, personal digital assistants (PDAs), cellular phones and smartphones.

Client 502 includes a CPU 526, a pointing device 528, a keyboard 530, a microphone 532, a printer 534, a memory 536, a mass memory storage 538, a GUI 540, a video camera 542, an input/output interface 544, and a network interface 546.

CPU 526, pointing device 528, keyboard 530, microphone 532, printer 534, memory 536, mass memory storage 538, GUI 540, video camera 542, input/output interface 544 and network interface 546 may communicate in a unidirectional manner or a bi-directional manner with each other via a communication channel 548. Communication channel 548 may be configured as a single communication channel or a multiplicity of communication channels.

CPU 526 may be comprised of a single processor or multiple processors. CPU 526 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 536 is used typically to transfer data and instructions to CPU 526 in a bi-directional manner. Memory 536, as discussed previously, may include any suitable computer-readable media, intended for data storage, such as those described above excluding any wired or wireless transmissions unless specifically noted. Mass memory storage 538 may also be coupled bi-directionally to CPU 526 and provides additional data storage capacity and may include any of the computer-readable media described above. Mass memory storage 538 may be used to store programs, data and the like and is typically a secondary storage medium such as a hard disk. It will be appreciated that the information retained within mass memory storage 538, may, in appropriate cases, be incorporated in standard fashion as part of memory 536 as virtual memory.

CPU 526 may be coupled to GUI 540. GUI 540 enables a user to view the operation of computer operating system and software. CPU 526 may be coupled to pointing device 528. Non-limiting examples of pointing device 528 include computer mouse, trackball and touchpad. Pointing device 528 enables a user with the capability to maneuver a computer cursor about the viewing area of GUI 540 and select areas or features in the viewing area of GUI 540. CPU 526 may be coupled to keyboard 530. Keyboard 530 enables a user with the capability to input alphanumeric textual information to CPU 526. CPU 526 may be coupled to microphone 532. Microphone 532 enables audio produced by a user to be recorded, processed and communicated by CPU 526. CPU 526 may be connected to printer 534. Printer 534 enables a user with the capability to print information to a sheet of paper. CPU 526 may be connected to video camera 542. Video camera 542 enables video produced or captured by user to be recorded, processed and communicated by CPU 526.

CPU 526 may also be coupled to input/output interface 544 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 526 optionally may be coupled to network interface 546 which enables communication with an external device such as a database or a computer or telecommunications or internet network using an external connection shown generally as communication channel 516, which may be implemented as a hardwired or wireless communications link using suitable conventional technologies. With such a connection, CPU 526 might receive information from the network, or might output information to a network in the course of performing the method steps described in the teachings of the present invention. In one embodiment, as a voice communication device any of a computer-type device may be used. For example, such device might have no units 538, 540, 542, 528, 530, 534. In one embodiment, analog voice device which communicates with digital devices via a gateway may also be used.

Figure 6:
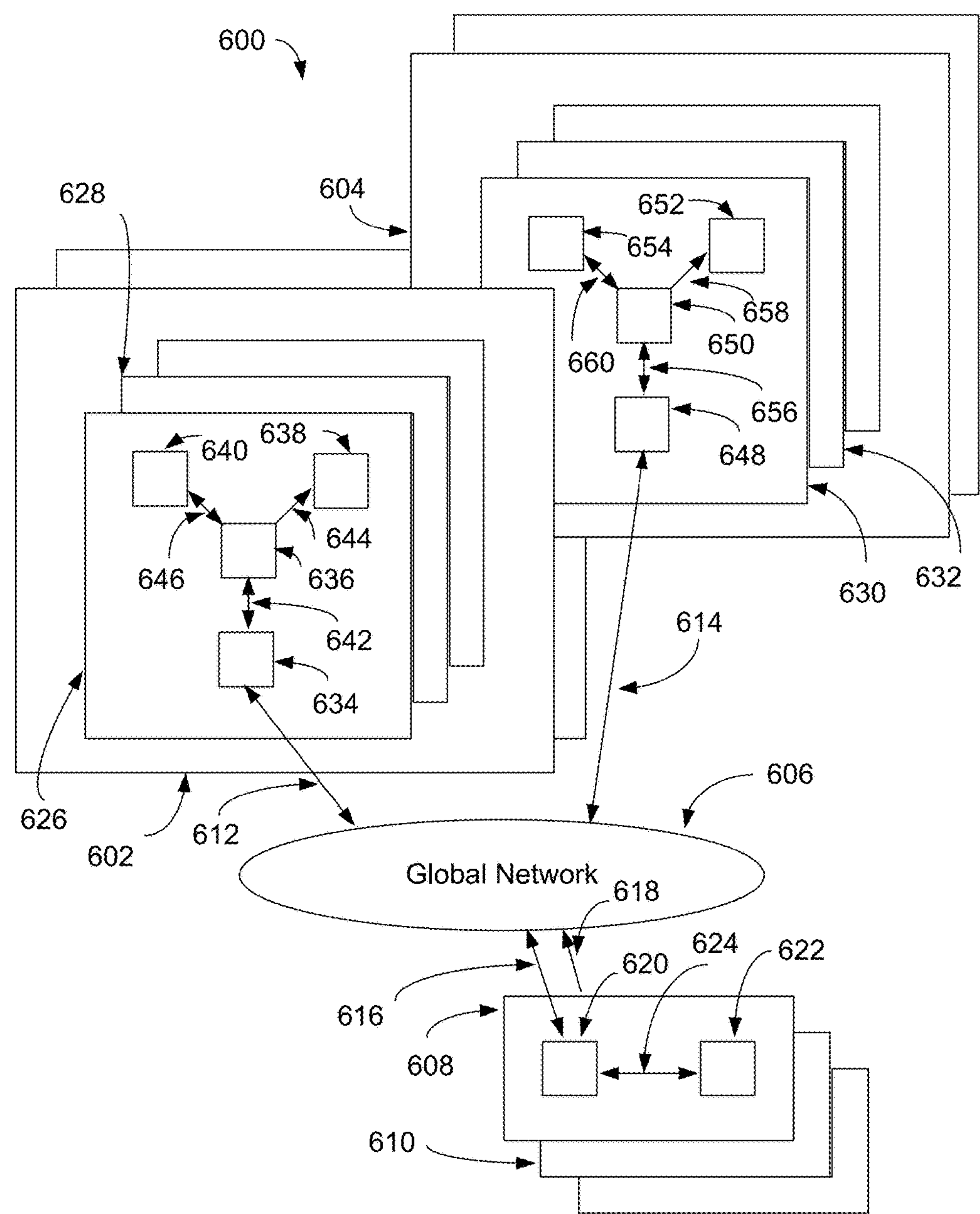
FIG. 6 illustrates a block diagram depicting a conventional client/server communication system.

FIG. 6 illustrates a block diagram depicting a conventional client/server communication system.

A communication system 600 includes a multiplicity of networked regions with a sampling of regions denoted as a network region 602 and a network region 604, a global network 606 and a multiplicity of servers with a sampling of servers denoted as a server device 608 and a server device 610.

Network region 602 and network region 604 may operate to represent a network contained within a geographical area or region. Non-limiting examples of representations for the geographical areas for the networked regions may include postal zip codes, telephone area codes, states, counties, cities and countries. Elements within network region 602 and 604 may operate to communicate with external elements within other networked regions or within elements contained within the same network region.

In some implementations, global network 606 may operate as the Internet. It will be understood by those skilled in the art that communication system 600 may take many different forms. Non-limiting examples of forms for communication system 600 include local area networks (LANs), wide area networks (WANs), wired telephone networks, cellular telephone networks or any other network supporting data communication between respective entities via hardwired or wireless communication networks. Global network 606 may operate to transfer information between the various networked elements.

Server device 608 and server device 610 may operate to execute software instructions, store information, support database operations and communicate with other networked elements. Non-limiting examples of software and scripting languages which may be executed on server device 608 and server device 610 include C, C++, C# and Java.

Network region 602 may operate to communicate bi-directionally with global network 606 via a communication channel 612. Network region 604 may operate to communicate bi-directionally with global network 606 via a communication channel 614. Server device 608 may operate to communicate bi-directionally with global network 606 via a communication channel 616. Server device 610 may operate to communicate bi-directionally with global network 606 via a communication channel 618. Network region 602 and 604, global network 606 and server devices 608 and 610 may operate to communicate with each other and with every other networked device located within communication system 600.

Server device 608 includes a networking device 620 and a server 622. Networking device 620 may operate to communicate bi-directionally with global network 606 via communication channel 616 and with server 622 via a communication channel 624. Server 622 may operate to execute software instructions and store information.

Network region 602 includes a multiplicity of clients with a sampling denoted as a client 626 and a client 628. Client 626 includes a networking device 634, a processor 636, a GUI 638 and an interface device 640. Non-limiting examples of devices for GUI 638 include monitors, televisions, cellular telephones, smartphones and PDAs (Personal Digital Assistants). Non-limiting examples of interface device 640 include pointing device, mouse, trackball, scanner and printer interface device may be virtual command line accessed via network (SSH, telnet, etc) or serial port (RS-232, USB, etc)]. Networking device 634 may communicate bi-directionally with global network 606 via communication channel 612 and with processor 636 via a communication channel 642. GUI 638 may receive information from processor 636 via a communication channel 644 for presentation to a user for viewing. Interface device 640 may operate to send control information to processor 636 and to receive information from processor 636 via a communication channel 646. Network region 604 includes a multiplicity of clients with a sampling denoted as a client 630 and a client 632. Client 630 includes a networking device 648, a processor 650, a GUI 652 and an interface device 654. Non-limiting examples of devices for GUI 638 include monitors, televisions, cellular telephones, smartphones and PDAs (Personal Digital Assistants). Non-limiting examples of interface device 640 include pointing devices, mousse, trackballs, scanners and printers. Networking device 648 may communicate bi-directionally with global network 606 via communication channel 614 and with processor 650 via a communication channel 656. GUI 652 may receive information from processor 650 via a communication channel 658 for presentation to a user for viewing. Interface device 654 may operate to send control information to processor 650 and to receive information from processor 650 via a communication channel 660, and an analog telephone device also may be used through a gateway.

For example, consider the case where a user interfacing with client 626 may want to execute a networked application. A user may enter the IP (Internet Protocol) address for the networked application using interface device 640. The IP address information may be communicated to processor 636 via communication channel 646. Processor 636 may then communicate the IP address information to networking device 634 via communication channel 642. Networking device 634 may then communicate the IP address information to global network 606 via communication channel 612. Global network 606 may then communicate the IP address information to networking device 620 of server device 608 via communication channel 616. Networking device 620 may then communicate the IP address information to server 622 via communication channel 624. Server 622 may receive the IP address information and after processing the IP address information may communicate return information to networking device 620 via communication channel 624. Networking device 620 may communicate the return information to global network 606 via communication channel 616. Global network 606 may communicate the return information to networking device 634 via communication channel 612. Networking device 634 may communicate the return information to processor 636 via communication channel 642. Processor 646 may communicate the return information to GUI 638 via communication channel 644. User may then view the return information on GUI 638.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6). In some embodiments, the methods and/or system components which may be located and/or performed remotely include, without limitation: onward calling device, receiving device, databases, and communication computing system. It is noted that according to USA law, all claims must be set forth as a coherent, cooperating set of limitations that work in functional combination to achieve a useful result as a whole. Accordingly, for any claim having functional limitations interpreted under 35 USC § 112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6) is/(are) dependent on one or more remote servers located outside the USA, it is intended that each such recited function under 35 USC § 112 (6) is to be interpreted as the function of the local system receiving the remotely generated information required by a locally implemented claim limitation, wherein the structures and or steps which enable, and breathe life into the expression of such functions claimed under 35 USC § 112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3rd parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing system of routing a user communication according to the present invention will be apparent to those skilled in the art. Various aspects of the invention have been described above by way of illustration, and the specific embodiments disclosed are not intended to limit the invention to the particular forms disclosed. The particular implementation of the system of routing a user communication may vary depending upon the particular context or application. By way of example, and not limitation, the system of routing a user communication described in the foregoing were principally directed to user communication route implementations; however, similar techniques may instead be applied to real time communication system which may utilize routing, for example, in video communications or video conferencing; any real time voice conferencing; any voice or video transmission systems or applications, for example, broadcasting; any PSTN segment; any cellular network segment; any voice content distribution system; any data transmission system, for example, IP network or subnet, time division multiplexing (TDM) network, ISDN network; any channel switching system, for example, PBX, voice switch, data switch; etc. . . . , which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. A method for routing communication, the method comprising the steps of:

launching a computer software stored on a non-transitory computer readable medium of a communication computing system, to select an optimum route for an outgoing call;

identifying at least a receiver or group subscriber ID of a call receiver device from an outgoing call of an outgoing call subscriber ID of an outgoing call device;

determining if said identified subscriber ID is on a list of short duration calls;

extracting a communication route previously used to establish a connection with said identified subscriber ID based on a result of said determining step that said identified subscriber ID is on a list of short duration calls;

marking said extracted communication route as bad quality communication route as a result of said outgoing call device trying to reach said identified subscriber ID a second or third time after a short duration call;

adding said marked communication route and said identified subscriber ID to a list of bad quality communication routes;

deleting said extracted communication route and identified subscriber ID from said list of short duration calls;

receiving a list of all available communication routes;

selecting at least a first communication route from said received list of all available communication routes;

determining whether said selected first communication route and said identified subscriber ID are contained in a list of bad quality communication routes;

establishing a connection between said outgoing call device and said call receiver device via said selected first communication route based on a result of said determining step that said list of bad quality communication routes does not contain a combination of said selected first communication route and said identified subscriber ID;

monitoring said established connection between said outgoing call device and said call receiver device;

determining if a duration of said established connection is longer or shorter than a predetermined minimum duration of a good quality communication route; and entering said receiver or group subscriber ID and said selected first communication route into said list of short duration calls based on said duration being shorter than said predetermined minimum duration of a good quality communication route.

2. The method of claim 1, further comprising, based on a result of said determining step that said list of bad quality communication routes contains a combination of said selected first communication route and said identified subscriber ID, the steps of:

determining an additional or second communication route in said list of all available communication routes;

deleting all communication routes used to reach said identified subscriber ID if said additional or second communication route is a last entry in said list of all available communication routes; and entering said identified subscriber ID into a "not possible to select a high quality communication route" list.

3. A method for routing communication, the method comprising the steps of:

launching a computer software stored on a non-transitory computer readable medium of a communication computing system, to select an optimum route for an outgoing call;

identifying, with a user ID identification module, at least a receiver or group subscriber ID of a call receiver device from an outgoing call of an outgoing call subscriber ID of an outgoing call device;

determining whether said identified subscriber ID has been entered on a list of short duration calls;

receiving a list of all available communication routes based on a result of said determining step that said identified subscriber ID is not entered on said list of short duration calls;

selecting at least one communication route from said received list of all available communication routes configured to be used by said identified subscriber ID;

determining whether a list of low quality communication routes contains a combination of said selected communication route and said identified subscriber ID;

establishing a connection between said outgoing call device and said call receiver device via said selected communication route based on a result of said comparing step that said list of low quality communication routes do not contain a combination of said selected communication route and said identified subscriber ID;

monitoring a duration of said established connection between said outgoing call device and said call receiver device;

determining if said duration of said established connection is longer or shorter than a predetermined minimum duration of a good quality communication route; and entering said receiver or group subscriber ID and said selected communication route into said list of short duration calls based on a result of said duration determining step that said duration is shorter than a predetermined minimum duration of a good quality communication route.

4. The method of claim 3, further comprising, based on a result of said determining step that said identified subscriber ID is on a list of short duration calls, the steps of:

extracting a communication route previously used to establish a connection with said identified subscriber ID from said list of short duration calls;

marking said extracted communication route as bad quality communication route if said outgoing call device is trying to reach said identified subscriber ID a second or third time after a short duration call or dropped communication call;

adding said marked communication route and said identified subscriber ID to a bad quality communication routes list; and deleting said extracted or marked communication route and identified subscriber ID from said list of short duration calls.

5. The method of claim 4, further comprising, based on a result of said determining step that said list of bad quality communication routes contains a combination of said selected communication route and said identified subscriber ID, the steps of:

determining an additional or second communication route in said list of all available communication routes;

deleting all communication routes used to reach said identified subscriber ID if said list of bad quality communication routes contains a combination of said additional or second communication route and said identified subscriber ID; and entering said identified subscriber ID into a "not possible to select a high quality communication route" list.

6. The method of claim 5, further comprising the step of detecting, with a communication drop detection module, a communication drop between said established connection between said outgoing call device and said call receiver device via said selected communication route.

* * * * *